(12) United States Patent
Rowe

(10) Patent No.: US 6,401,584 B1
(45) Date of Patent: Jun. 11, 2002

(54) MITER CUTTING GUIDE APPARATUS

(76) Inventor: James T. Rowe, 12155 Valley Lane Dr., Garfield Heights, OH (US) 44125

( * ) Notice: Subject to any disclaimer, the term of this patent is extended or adjusted under 35 U.S.C. 154(b) by 0 days.

(21) Appl. No.: 09/619,342

(22) Filed: Jul. 19, 2000

(51) Int. Cl.[7] ............................................... B27B 27/00
(52) U.S. Cl. ............................. 83/829; 83/821; 83/581; 33/452
(58) Field of Search .................... 83/829, 821, 421, 83/581; 33/1 N, 452, 456, 465, 471, 495–500, 534, 538, 626, 628, 640, 630, 1

(56) References Cited

U.S. PATENT DOCUMENTS

| | | | | |
|---|---|---|---|---|
| 390,705 A | * | 10/1888 | Quayle | 33/452 |
| 732,827 A | * | 7/1903 | Chambers | 33/456 |
| 4,660,293 A | * | 4/1987 | Kovacs | 33/471 |
| 4,955,141 A | * | 9/1990 | Welch | 33/418 |
| 5,007,174 A | * | 4/1991 | Cook | 33/465 |
| 5,020,233 A | * | 6/1991 | Syken | 33/465 |
| 6,240,649 B1 | * | 6/2001 | McElroy | 33/286 |

* cited by examiner

Primary Examiner—Boyer Ashley
Assistant Examiner—Omar Flores Sánchez
(74) Attorney, Agent, or Firm—John D. Gugliotta

(57) ABSTRACT

A miter cutting guide apparatus is provided to aid in the making of miter cuts used on wood millwork as trim around floors, walls, doors, cabinets and the like and which can also be used on ceramics such as for tile cutting. Two miter arms are pivotally attached by a pivot locking means such as a screw. Each miter arm has a complementary base resting underneath and being guidably received by each miter arm, thereby allowing each miter arm to reciprocate along its complementary base.

3 Claims, 5 Drawing Sheets

MITER CUTTING GUIDE APPARATUS

RELATED APPLICATIONS

The present invention was first described in Disclosure Document No. 467,912 filed on Jan. 20, 2000. There are no previously filed, nor currently any co-pending applications, anywhere in the world.

BACKGROUND OF THE INVENTION

1. Field of the Invention

The present invention relates generally to miters used for cutting materials on table saws, router tables, band saws and other types of shaping and cutting tools and, more particularly, to a miter guide cutting apparatus.

2. Description of the Related Art

Construction and wood working projects require a variety of tools and accessories in order to ensure proper measurements for sizing pieces prior to performing cuts and/or assembly. One of the more difficult cuts to make is a miter cut for inside or outside corners. These cuts are commonly used on wood millwork or molding as trim around floors, walls, doors, cabinets and the like, and as such are usually visible to any observer at the completion of a project. A common 45 degree angle cut will work as long as the surfaces are perfectly square. However, in many situations such as angled walls, counter tops and the like they are not. Even walls that should be perfectly square commonly are not. During these occasions, the user must measure the angle, divide it in half, and set the saw blade accordingly. Often, the results of this process are less than satisfactory, and even if they are, much time is spent measuring, calculating and setting.

A search of the prior art did not disclose any patents that read directly on the claims of the instant invention; however, the following references were considered related. The following patents disclose the design and function of an improved miter gauge: U.S. Pat. No. 5,379,669 issued in the name of Roedig; U.S. Pat. No. 4,514,909 issued in the name of Gilbert; and U.S. Pat. No. Des. 400,452 issued in the name of Schoene et al.

The following patents describe a locking means for a miter gauge attachment: U.S. Pat. No. 4,741,387 issued in the name of Strong; and U.S. Pat. No. 4,454,793 issued in the name of Strong.

U.S. Pat. No. 5,493,789 issued in the name of Duginske discloses a miter gauge calibrator.

U.S. Pat. No. 5,402,701 issued in the name of Ingram describes a dual-angle miter gauge apparatus.

U.S. Pat. No. 5,097,601 issued in the name of Pollak et al. discloses a miter gauge with an adjustable width lead arm.

U.S. Pat. No. 5,042,346 issued in the name of McCain describes an apparatus for accurately fabricating mitered corners.

Consequently, a need has been felt for providing a device which allows a user to cut perfect miters for inside and outside corners in a manner which is quick, easy and effective.

SUMMARY OF THE INVENTION

Therefore, it is an object of the present invention to provide a miter cutting device which aids in the cutting of millwork to fit inside and outside corners.

It is another object of the present invention to provide a miter cutting device which meets a consummate standard for making miter cuts used on wood millwork.

It is still another object of the present invention to provide a miter cutting device which can be utilized with any type of power saw and which saves the user time and money.

Briefly described according to one embodiment of the present invention, a miter cutting guide apparatus is provided to aid in the making of miter cuts used on wood millwork as trim around floors, walls, doors, cabinets and the like and which can also be used on ceramics such as for tile cutting. Two miter arms are pivotally attached by a pivot locking means such as a screw. Each miter arm has a complementary base resting underneath and being guidably received by each miter arm, thereby allowing each miter arm to reciprocate along its complementary base.

The present invention pivotally adjusts to a desired angle and is temporarily held in such position through frictional engagement between a lower surface of a first miter arm and an upper surface of a complementary base of a second miter arm. The present invention is capable of measuring angles up to 120 degrees.

Coupled to the pivot locking is a centerbar. Designed to reciprocate vertically with respect to the plane formed by the first miter arm and the second miter arm, the centerbar acts as an angle bisecting means.

Disposed along a linearly elongated centerline of the centerbar is a centerline. The centerline allows a user the ability to transfer the fixed position of the centerline directly to a miter saw and then adjust the blade of the saw to this particular measurement.

Formed along an upper surface of the second miter arm is a cavity having an angle measuring gauge resting therein. The angle measuring gauge displays a measured bisected angle, thereby allowing a user the option of setting a miter saw at this particular measurement without relying upon the centerline.

Utilization of either the centerline or the angle measuring gauge will operate equally well to allow a user to meet a consummate standard for making miter cuts.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENT

1. Detailed Description of the Figures

Figure 1:
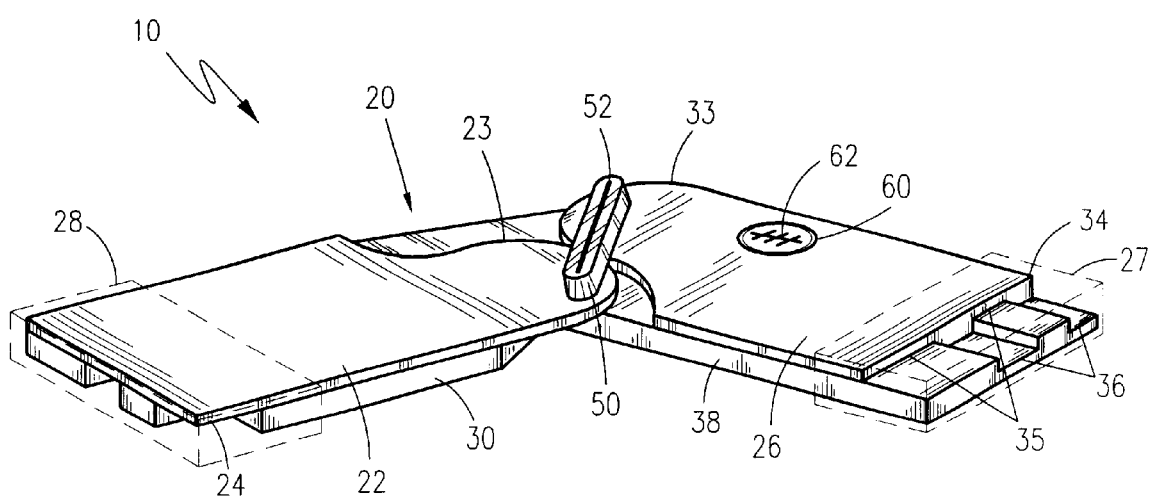
FIG. 1 is a perspective view of a miter cutting guide apparatus according to the preferred embodiment of the present invention.
Figure 2:
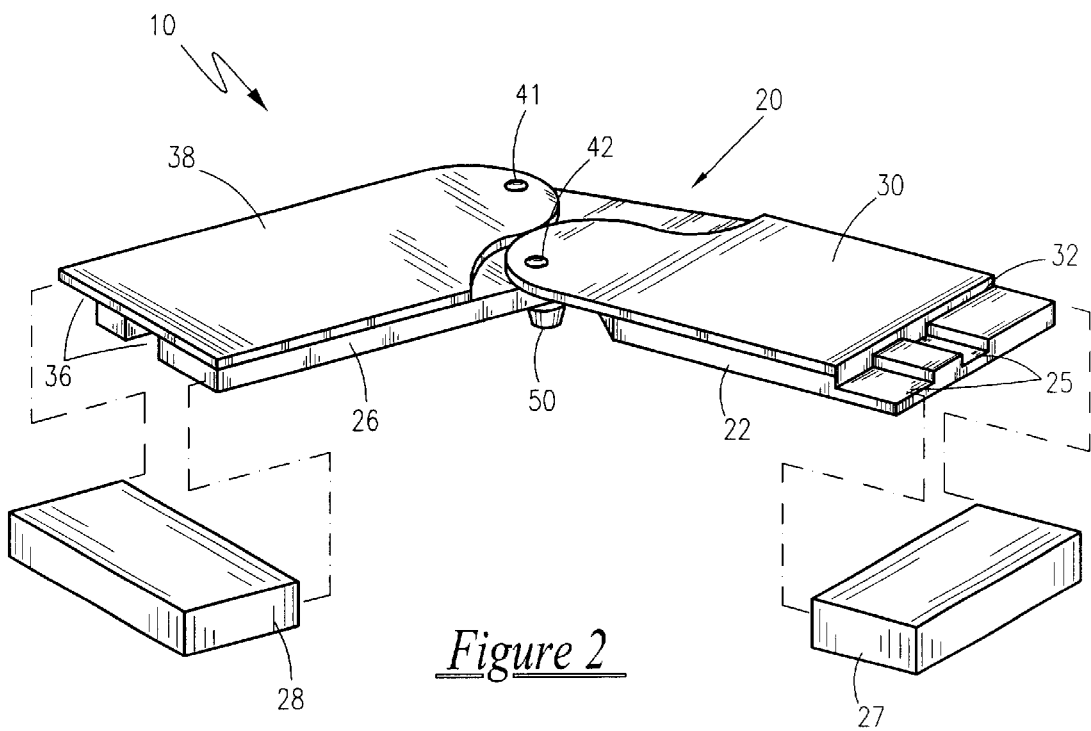
FIG. 2 is a bottom view thereof.
Figure 3:
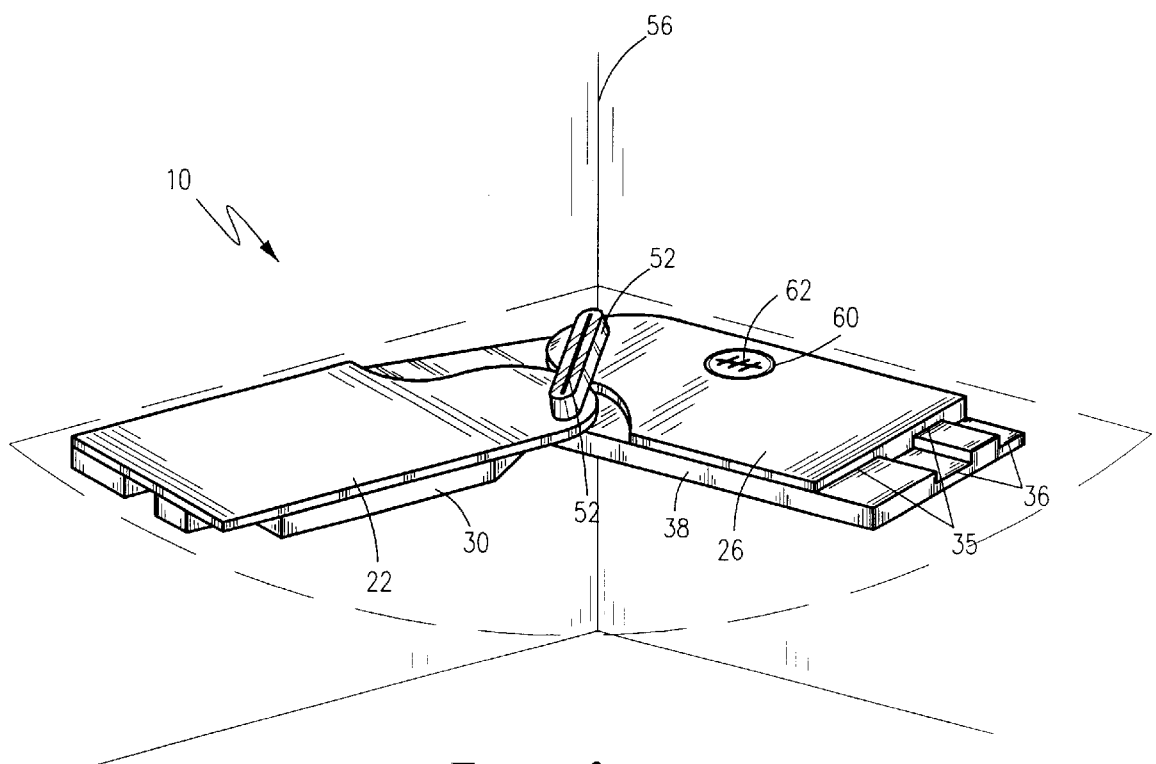
FIG. 3 is a perspective view thereof shown in use.
Figure 4:
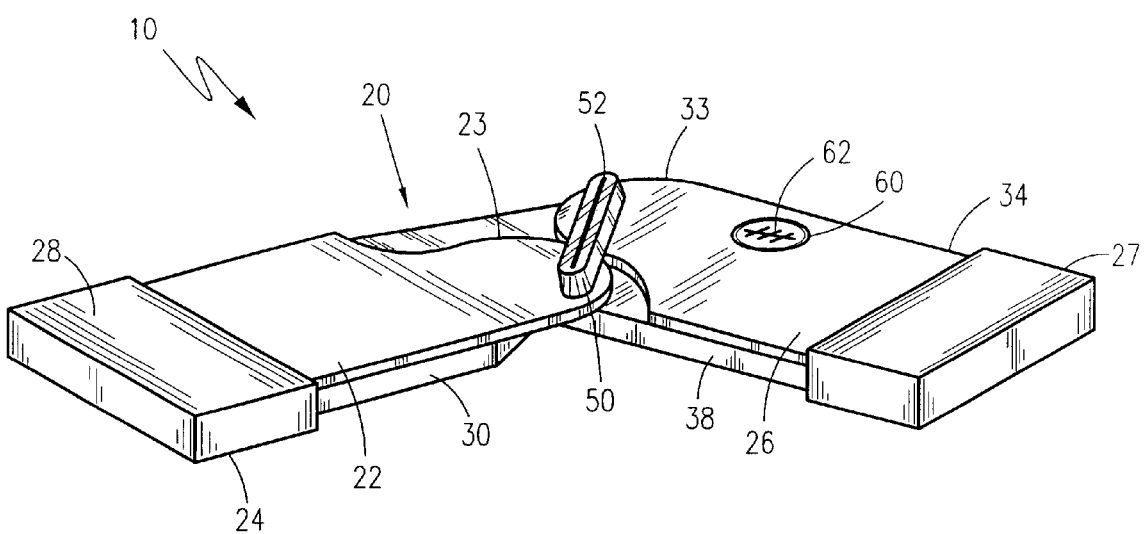
FIG. 4 is a perspective view thereof shown with protective jackets.
Figure 5:
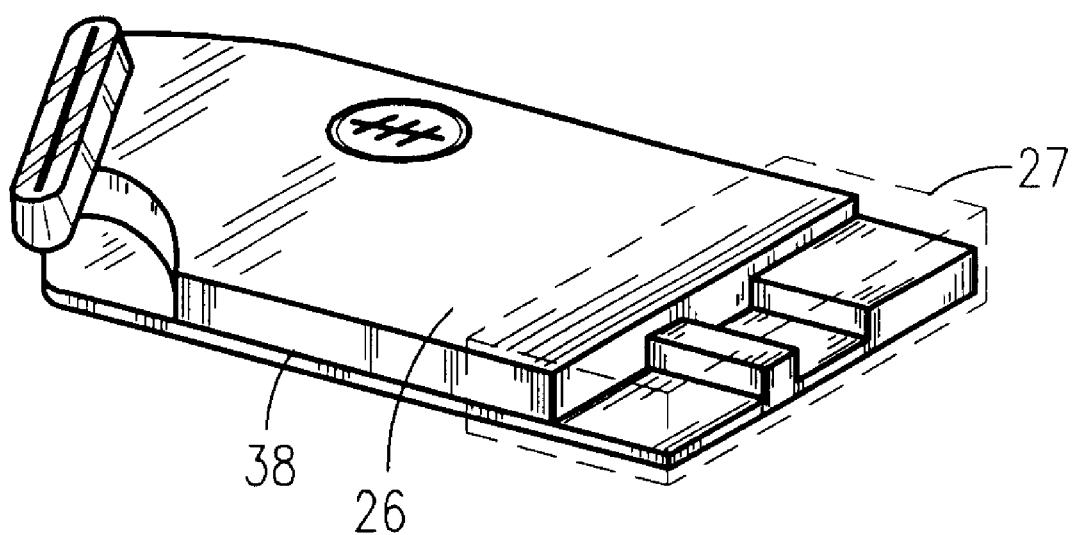
FIG. 5 is a perspective view of the second miter arm and second complementary base with protective jacket shown in phantom.

Referring now to FIGS. 1–3, a miter cutting guide apparatus 10 is shown, according to the present invention, comprised of a miter arm pivot assembly 20 which includes a first miter arm 22 pivotally attached to a second miter arm 26, a slidable centerbar 50 and an angle measuring gauge 62 for meeting a consummate standard for making miter cuts used on wood millwork as trim around floors, walls, cabinets and the like.

The apparatus 10 is formed of plastic or other material capable of injection molding, and therefore can be formed easily of recycled material.

The first miter arm 22 is of a generally, linearly elongated rectangular configuration, having an anterior end 23 opposite a posterior end 24. The anterior end 23 of the first miter arm 22 forming a tapered portion. The first miter arm 22 further having channeled grooves 25 extending the entire linear length along an underside thereof for slidably engaging complementary grooves 32 formed in a first complementary base 30. The first complementary base 30 is of a generally, linearly elongated rectangular configuration resting underneath and being guidably received by the first miter arm 22, thereby allowing the first miter arm 22 to reciprocate along the elongated centerline of the first complementary base 30.

The second miter arm 26 is of a generally, linearly elongated rectangular configuration having an anterior end 33 opposite a posterior end 34. The anterior end 33 of the second miter arm 26 forms a tapered portion. The second miter arm 26 further has channeled grooves 35 extending an entire length along an underside thereof for slidably engaging complementary grooves 36 formed in a second complementary base 38. The second complementary base 38 is of a generally, linearly elongated rectangular configuration resting underneath and being guidably received by the second miter arm 26, thereby allowing the second miter arm 26 to reciprocate along the elongated centerline of the second complementary base 38.

The anterior end 23 of the first miter arm 22 along with the first complementary base 30 is pivotally attached to the anterior end 33 of the second miter arm 26 along with the second complementary base 38 by pivot locking means 41, 42 such as a screw.

A first pivot locking 41 means penetrates a tapered portion of the first miter arm 22 through to the first complementary base 30, while a second pivot locking means 42 penetrates a tapered portion of the second miter arm 26 through to the second complementary base 38.

The first miter arm 22 is a mirror image of the second miter arm's 26 complementary base 38 and the second miter arm 26 is a mirror image of the first miter arm's 22 complementary base 30. Such design prevents mechanical interference as the present invention pivots.

The present invention pivotally adjusts to a desired angle and is temporarily held in such position through frictional engagement between a lower surface of the first miter arm 22 and an upper surface of the complementary base 38 of the second miter arm 26. The present invention is capable of measuring angles up to 120 degrees.

In order to prevent entry of saw dust and other particles from the posterior end 24 of the first miter arm 22 and the first complementary base 30, and the second miter arm 26 and the second complementary base 38, protective jackets 27, 28, of a linearly elongated, rectangular, hollow configuration are fastened to a lower surface of the second complementary base 38 at the posterior end 34 and extending a distance therefrom and to an upper surface of the first miter arm 22 at the posterior end 24 and extending a distance therefrom, respectively. The protective jackets 27, 28 are fastened in such a manner so as to allow the second miter arm 26 to reciprocate unimpeded within the jacket 27 along the elongated centerline of the second complementary base 38 and allows the first miter arm 22 to reciprocate unimpeded while fastened to the jacket 28 along the elongated centerline of the first complementary base 30.

The protective jackets 27, 28 not only provide a protective sleeve for keeping out saw dust and for preventing damage to the posterior ends 24, 34 of the present invention, they also allow for better handling of the apparatus.

Coupled to the pivot locking means 41, 42 on an upper surface and at the anterior end 23, 33 of each miter arm 22, 26 respectively, is a centerbar 50 of a linearly elongated configuration. Designed to reciprocate vertically with respect to the plane formed by the first miter arm 22 and the second miter arm 26, the centerbar 50 acts as an angle bisecting means. As the first miter arm 22 and the second miter arm 26 are pivotally adjusted to accommodate a desired corner angle 56 (as shown in FIG. 3), the centerbar 50 remains vertically positioned with respect to the miter arms 22, 26 and will abstain from pivoting with the miter arms 22, 26, thereby providing an acurate bisected angle. The reciprocating design of the centerbar 50 prevents the centerbar 50 from coming into mechanical interference with an inside or outside corner 56 of wood millwork. For example, after placing the present invention on a desired surface or corner, a user can easily vertically adjust the centerbar 50 in a direction away from the corner, thereby preventing mechanical interference.

Disposed along a linearly elongated centerline of the centerbar 50 is a centerline 52. The centerline 52 functions as a directional angle indicia and allows a user the ability to transfer the fixed position of the centerline 52 directly to a miter saw and then adjust the blade of the saw to this particular measurement.

Formed along an upper surface of the second miter arm 26 is a cavity 60 having an angle measuring gauge 62 resting therein. The angle measuring gauge 62 displays a measured bisected angle, thereby allowing a user the option of setting a miter saw at this particular measurement without relying upon the centerline 52.

Utilization of either the centerline 52 or the angle measuring gauge 62 will operate equally well to allow a user to make miter cuts.

2. Operation of the Preferred Embodiment

As shown in FIG. 3, to use the present invention, the user simply places the miter cutting guide apparatus 10 up against surfaces to which wood is to be applied. After an angle is set, the two miter arms 22, 26 are locked into place through frictional engagement. Next, the user uses the centerline 52 of the centerbar 50 to transpose the angle to a saw blade of a circular saw, a miter saw, a radial arms saw, or the like. However, by using a common edge of the invention, the angle is automatically bisected or divided into equal halves. This allows for the perfect cutting of miter joints that match perfectly. Additionally, the present invention provides an angle measuring gauge that allows the user to read the measured angle directly if desired.

The use of the present invention allows a user to cut perfect miters for inside and outside corners in a manner which is quick, easy and effective.

Therefore, the foregoing description is included to illustrate the operation of the preferred embodiment and is not meant to limit the scope of the invention. As one can envision, an individual skilled in the relevant art, in conjunction with the present teachings, would be capable of incorporating many minor modifications that are anticipated within this disclosure. Therefore, the scope of the invention is to be broadly limited only by the following claims.

What is claimed is:

1. A miter cutting guide apparatus comprising:
   a miter arm pivot assembly having a first miter arm pivotally attached to a second miter arm, wherein said miter arm pivot assembly is formed of a material capable being made of injection molding a slidable centerbar; and an angle measuring gauge;

wherein said first miter arm is of a generally linearly elongated rectangular configuration, having an anterior end opposite a posterior end, said anterior end forming a tapered portion, said first miter arm further comprises channeled grooves extending an entire linear length along an underside thereof for slidably engaging complementary grooves formed in a first complementary base, and wherein said first complementary base is of a generally, linearly elongated rectangular configuration resting underneath and being guidably received by the first miter arm, thereby allowing the first miter arm to reciprocate along the elongated centerline of the first complementary base;

wherein said second miter arm is of a generally, linearly elongated rectangular configuration having an anterior end opposite a posterior end, said anterior end forming a tapered portion, said second miter arm further comprises channeled grooves extending an entire length along an underside thereof for slidably engaging complementary grooves formed in a second complementary base, and wherein said second complementary base is of a generally, linearly elongated rectangular configuration resting underneath and being guidably received by the second miter arm, thereby allowing the second miter arm to reciprocate along the elongated centerline of the second complementary base; and protective jackets of a linearly elongated, rectangular, hollow configuration fastened to a lower surface of said second complementary base at the posterior end and extending a distance therefrom and to an upper surface of the first miter arm at the posterior end;

wherein said anterior end of said first miter arm along with said first complementary base is pivotally attached to the anterior end of the second miter arm along with said second complementary base by a pivot locking means.

2. A miter cutting guide apparatus comprising:

a miter arm pivot assembly having a first miter arm pivotally attached to a second miter arm, wherein said miter arm pivot assembly is formed of a material capable being made of injection molding a slidable centerbar; and an angle measuring gauge;

wherein said first miter arm is of a generally linearly elongated rectangular configuration, having an anterior end opposite a posterior end, said anterior end forming a tapered portion, said first miter arm further comprises channeled grooves extending an entire linear length along an underside thereof for slidably engaging complementary grooves formed in a first complementary base, and wherein said first complementary base is of a generally, linearly elongated rectangular configuration resting underneath and being guidably received by the first miter arm, thereby allowing the first miter arm to reciprocate along the elongated centerline of the first complementary base;

wherein said second miter arm is of a generally, linearly elongated rectangular configuration having an anterior end opposite a posterior end, said anterior end forming a tapered portion, said second miter arm further comprises channeled grooves extending an entire length along an underside thereof for slidably engaging complementary grooves formed in a second complementary base, and wherein said second complementary base is of a generally, linearly elongated rectangular configuration resting underneath and being guidably received by the second miter arm, thereby allowing the second miter arm to reciprocate along the elongated centerline of the second complementary base; and protective jackets of a linearly elongated, rectangular, hollow configuration fastened to a lower surface of said first complementary base at the posterior end and extending a distance therefrom and to an upper surface of the second miter arm at the posterior end;

wherein said anterior end of said first miter arm along with said first complementary base is pivotally attached to the anterior end of the second miter arm along with said second complementary base by a pivot locking means.

3. The miter cutting guide apparatus of claim 2, wherein said centerbar is coupled to said pivot locking means on an upper surface and at the anterior end of each miter arm, respectively, and whereby said centerbar acts as an angle bisecting means by remaining vertically positioned with respect to said miter arms.

* * * * *